No. 808,283. PATENTED DEC. 26, 1905.
G. B. GOULD.
GATE AND MEANS FOR SUPPORTING, OPERATING, AND FASTENING THE SAME.
APPLICATION FILED MAY 26, 1904.
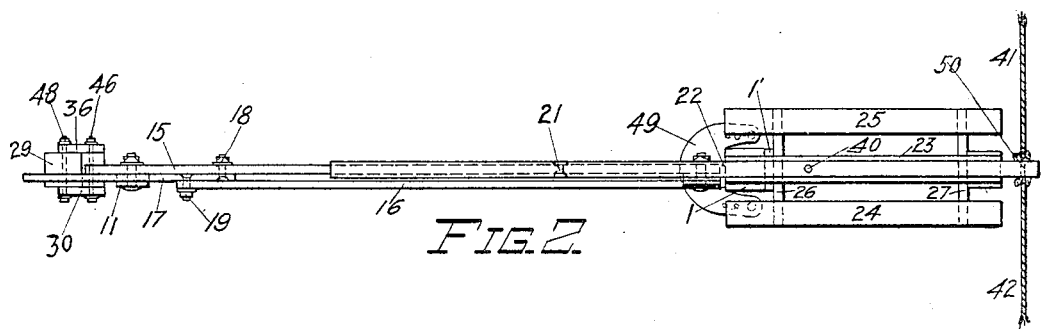
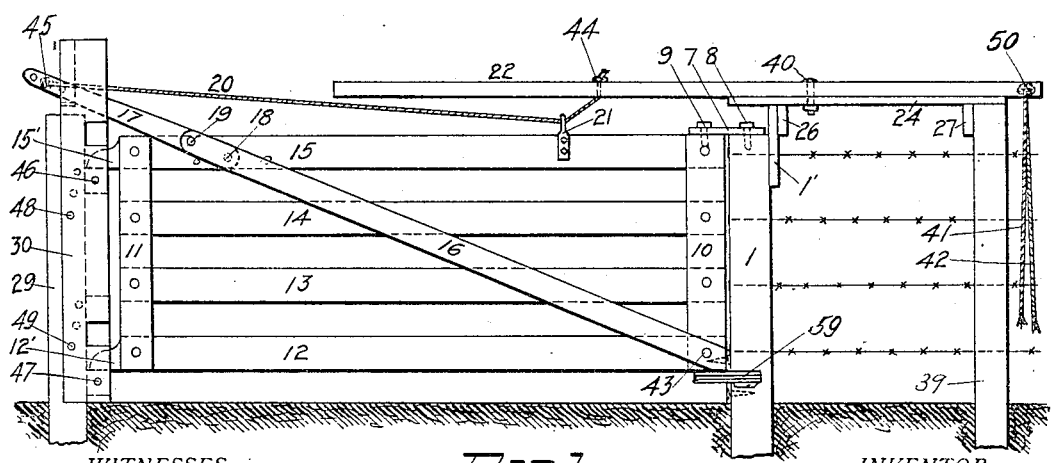

UNITED STATES PATENT OFFICE.

GEORGE BUDD GOULD, OF COLORADO SPRINGS, COLORADO.

GATE AND MEANS FOR SUPPORTING, OPERATING, AND FASTENING THE SAME.

No. 808,283.           Specification of Letters Patent.           Patented Dec. 26, 1905.

Application filed May 26, 1904. Serial No. 209,912.

*To all whom it may concern:*

Be it known that I, GEORGE BUDD GOULD, a citizen of the United States, and a resident of Colorado Springs, county of El Paso, State of Colorado, have invented new and useful Improvements in Gates and Means for Supporting, Operating, and Fastening the Same, as will more fully and particularly appear from the following description and accompanying drawings, which together form the specification, and to which reference is to be had, and in which similar characters of reference indicate corresponding parts in each figure.

Figure 1 is a side elevation of the gate and the mechanism for operating the same, showing the working parts with the gate closed. Fig. 2 is a top view of gate and operating mechanism as shown in Fig. 1.

In Fig. 1 the posts 1, 29, and 39 are shown as being mounted in the usual manner, with their lower ends planted in the earth. Mounted upon and to post 1 by hinge connection is upright 10. Pivotally connected at one end to upright 10 are longitudinal horizontal members 12 13 14 15 and brace 16. Members 13 and 14 are at their other end and 12 and 15 near their other end pivotally connected to and with upright 11. Brace 16 is pivotally connected at its lower end with members 10 and 12 at point 43, and its upper end is pivotally connected with lever 17 at point 19. Lever 17 is pivotally connected at its lower end with member 15 at point 18, which point is always on a line with and between points 19 and 43 when the free end of the gate is at its lowest point, which should be the point at which it rests when closed, and from which point the gate will rise whenever lever 17 is moved either up or down, which is also true of the fulcrum-point. By this arrangement the gate may be raised high with a lever, the short arm of which may be very short. When the gate is closed, as shown in Fig. 1, with lever 17 engaged in its keeper, it forms a lock, but a slight pull, which raises the lever, throwing points 18, 19, and 43 out of line, unlocks the gate, which is no longer rigid. It will be seen that the necessary members comprising this lifting mechanism are 10 15 16 17.

Mounted upon and fastened to post 1 is member 1', to and upon which is fastened member 26, and upon and to post 39 is fastened member 27, members 26 and 27 to be of appropriate lengths. Mounted upon and fastened to their upper edges are members 23 24 25 to form a bearing for lever 22. Lever 22 is mounted upon and pivotally connected to and with member 23 at point 40. Pliable connection 41 is connected with and fastened to lever 22 at point 50, from whence it may be extended to posts, arms, or other, suitable contrivance situated at the place at or from which it is desired to operate the gate from one direction. Pliable connection 42 is also connected with and fastened to lever 22 at point 50, from whence it may be extended to posts, arms, or other suitable contrivance situated at a point or points from which it is desired to operate the gate from another direction.

Lever 17 and lever 22 are connected by pliable connection 20, one end of which is fastened to lever 17 at point 45 and the other end of which after passing through eye 21 is fastened to lever 22 at point 44.

It will be observed that lever 22 is some longer than is necessary for lever purposes merely, that portion thereof extending from point 44 toward the swinging end of the gate being intended for and with pliable connection 20 provides an additional barrier calculated to deter breechy stock from jumping the gate and which may be of less height than would otherwise be necessary. It will also be noticed that lever 22 is pivotally connected with and fulcrumed upon member 23 at a point somewhat to the rear of the gate, this for the purpose of enabling the operator to swing the gate entirely open, so that it hangs in a position at right angles with that shown in Fig. 1 without the necessity of 22 passing a position at right angles with its position as shown. When power ceases to be applied, the tension upon pliable connection 20 will pull 22 back a little, so that it is always left in a position to be easily operated from the other side.

21 may be a pulley instead of an eye, if so desired.

Having thus described my invention, what I claim as new, and desire to secure by Letters Patent, is—

1. In a gate the combination comprising brace 16, lever 17 pivoted thereto and to the gate, pliable connection 20, eye 21, lever 22 and means for operating lever 22.

2. In a gate the combination comprising brace 16, lever 17 pivoted thereto and to the gate, pliable connection 20, eye 21 lever 22, pliable connections 41 and 42, as and for the purposes set forth.

3. In a gate the combination comprising upright 10, horizontal member 15, brace 16, lever 17 pivoted thereto and to member 15, pliable connection 20, eye 21, lever 22, a suitable bearing for 22, situated above and in the rear of the gate and adapted to permit 22 to turn thereon horizontally and means for operating said lever 22.

4. In a gate the combination, comprising upright 10, horizontal member 15, brace 16, lever 17 pivoted thereto and to member 15, eye 21, pliable connection 20, lever 22, a suitable bearing for lever 22, situated above and in the rear of the gate, and adapted to permit lever 22 to turn thereon horizontally, pliable connections 41 and 42, as and for the purposes set forth.

5. The combination comprising a post, a gate pivotally connected to said post, a brace pivotally connected at one of its ends to the heel of said gate, a lever pivotally connected to and fulcrumed upon the other end of said brace, one of the ends of said lever being pivotally connected with said gate, and means for operating said lever.

6. The combination comprising a post, a gate pivotally connected with said post, a brace pivotally connected at one of its ends to the heel of said gate, a lever pivotally connected to and fulcrumed upon the other end of said brace, one of the ends of said lever being pivotally connected with said gate, a suitable support and bearing provided at the rear of said post, a horizontal lever mounted upon said support and bearing and adapted to turn horizontally, an eye attached to said gate, pliable connection passing through said eye and connecting the free end of the first-mentioned lever to said horizontal lever, and means for operating said horizontal lever.

7. The combination comprising a post, a gate pivotally connected to said post, a brace pivotally connected at one of its ends to the heel of said gate, a lever pivotally connected to and fulcrumed upon said brace at its other end, one of the ends of said lever being pivotally connected with said gate.

8. The combination comprising a post, a flexibly-constructed gate pivotally connected to said post, a brace 16 pivotally connected at one of its ends to the heel of said gate, a lever 17 pivotally connected to and fulcrumed upon said brace at its other end, one of the ends of said lever being pivotally connected with said gate, substantially as and for the purposes set forth.

In testimony whereof I have signed my name to this specification in the presence of two subscribing witnesses.

GEORGE BUDD GOULD.

Witnesses:
W. B. CARTER,
W. E. MANLEY.